Figure 1:
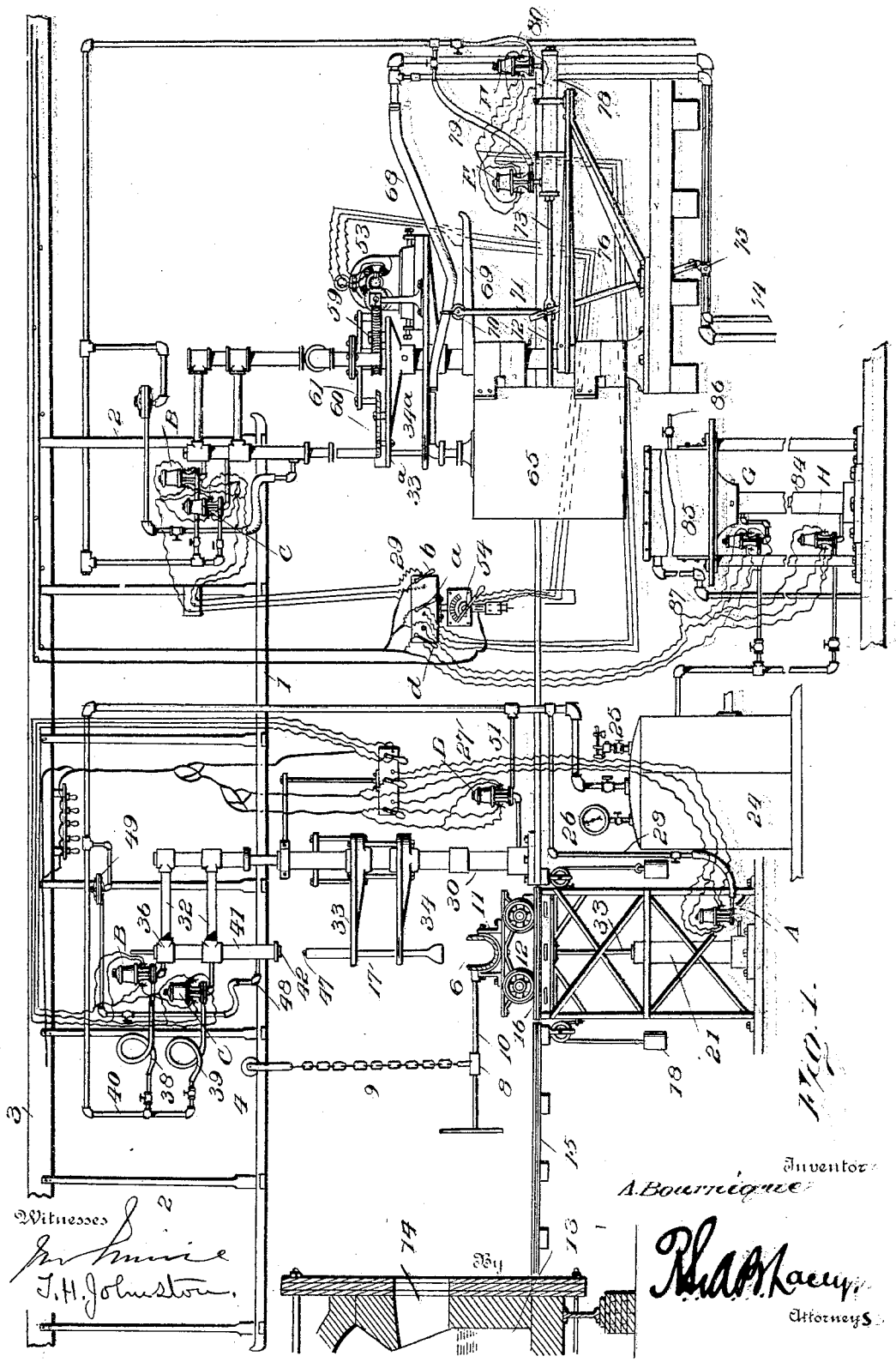

No. 771,763. PATENTED OCT. 4, 1904.
A. BOURNIQUE.
MACHINE FOR MANUFACTURING WINDOW GLASS.
APPLICATION FILED NOV. 16, 1903.
NO MODEL. 12 SHEETS—SHEET 4.

Witnesses
Inventor
A. Bournique
By R. A. P. Lacey, Attorneys

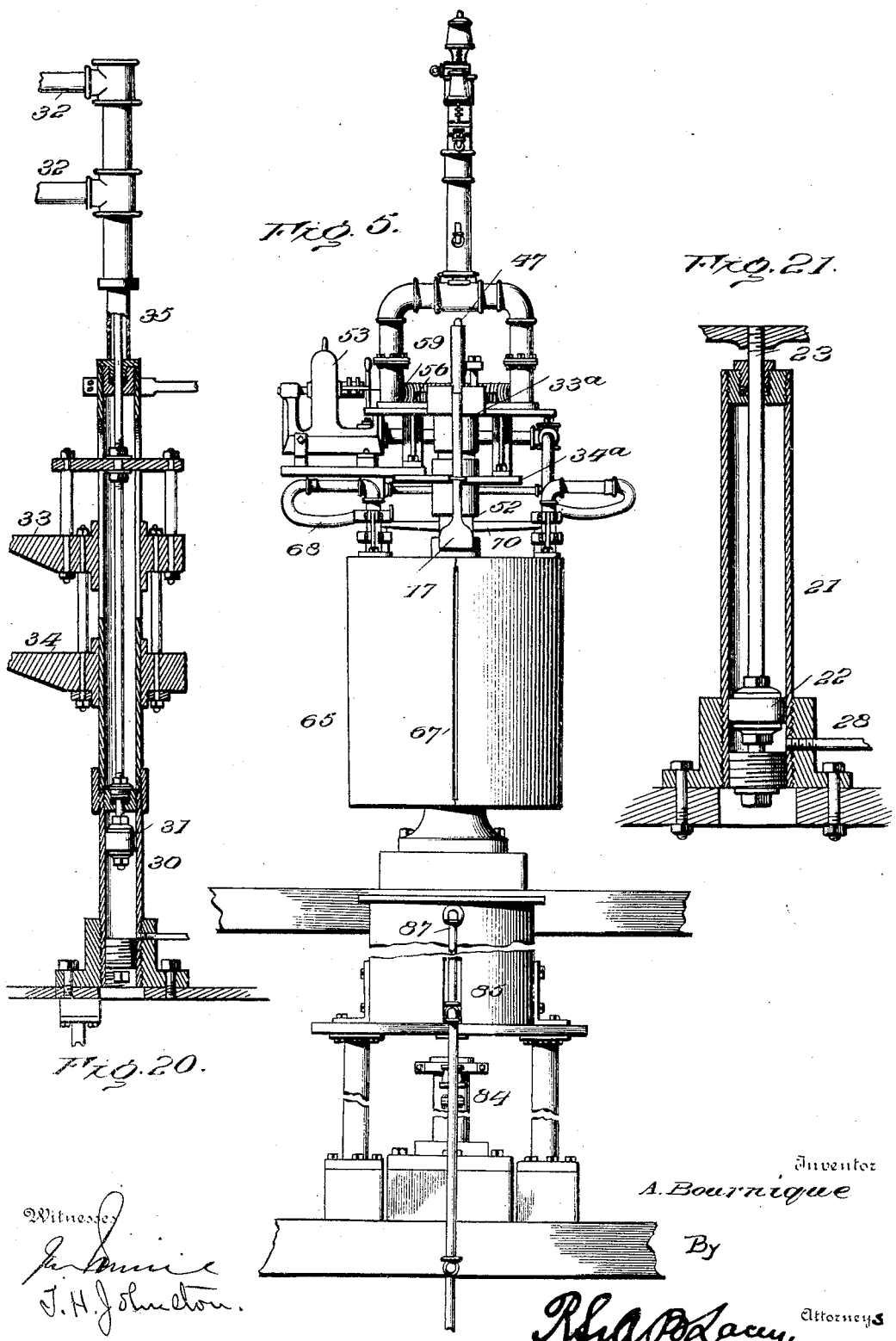

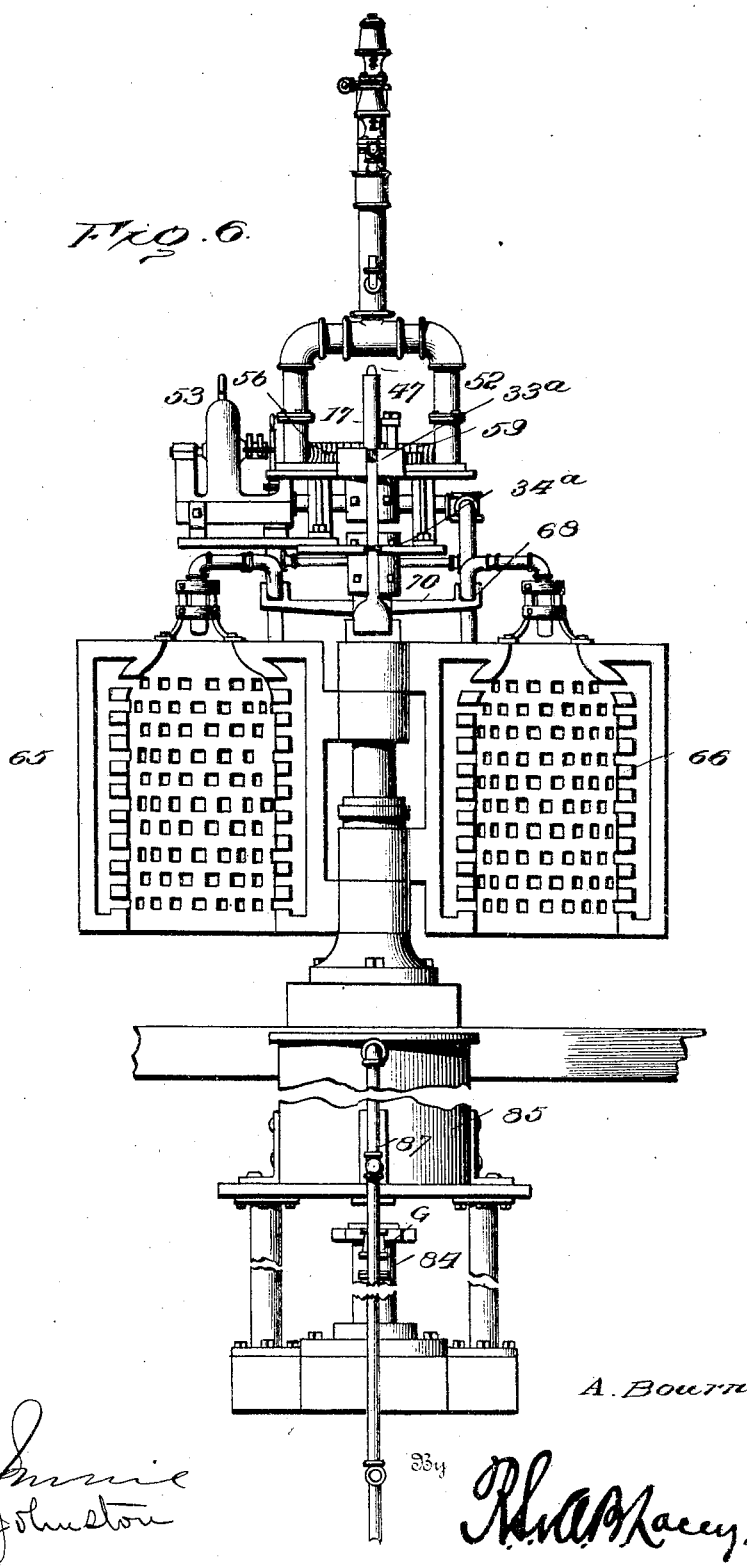

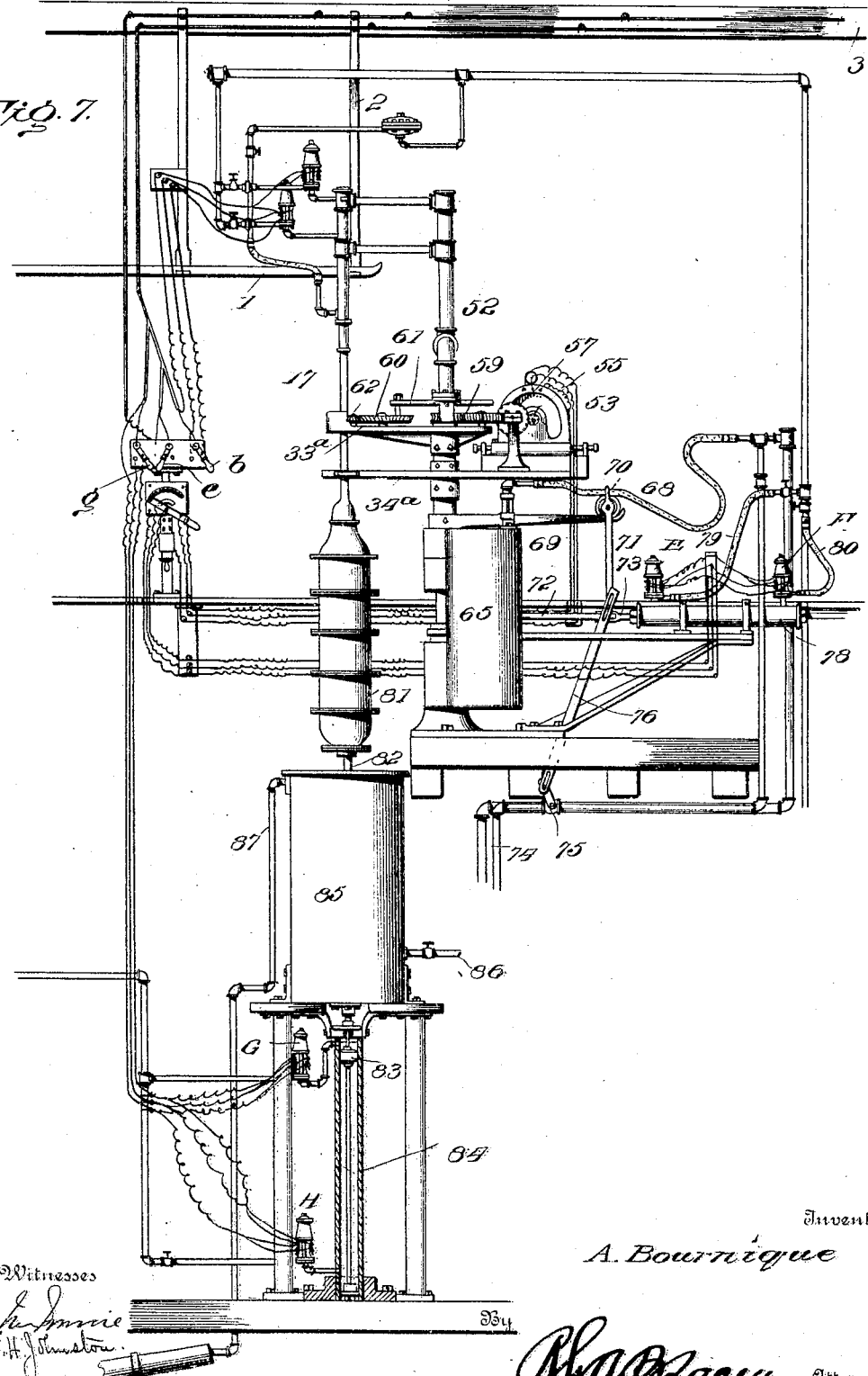

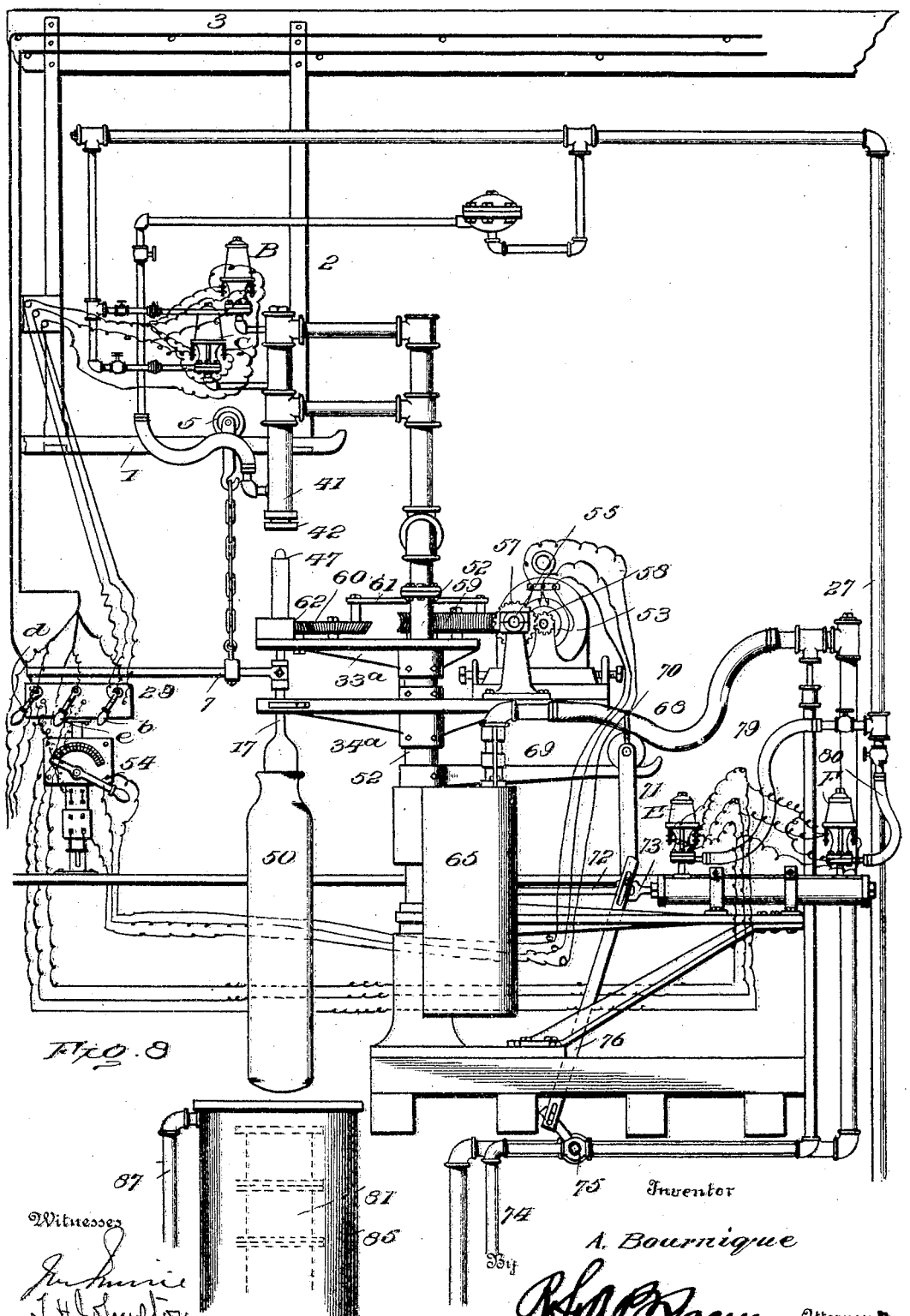

No. 771,763. PATENTED OCT. 4, 1904.
A. BOURNIQUE.
MACHINE FOR MANUFACTURING WINDOW GLASS.
APPLICATION FILED NOV. 16, 1903.
NO MODEL. 12 SHEETS—SHEET 9.
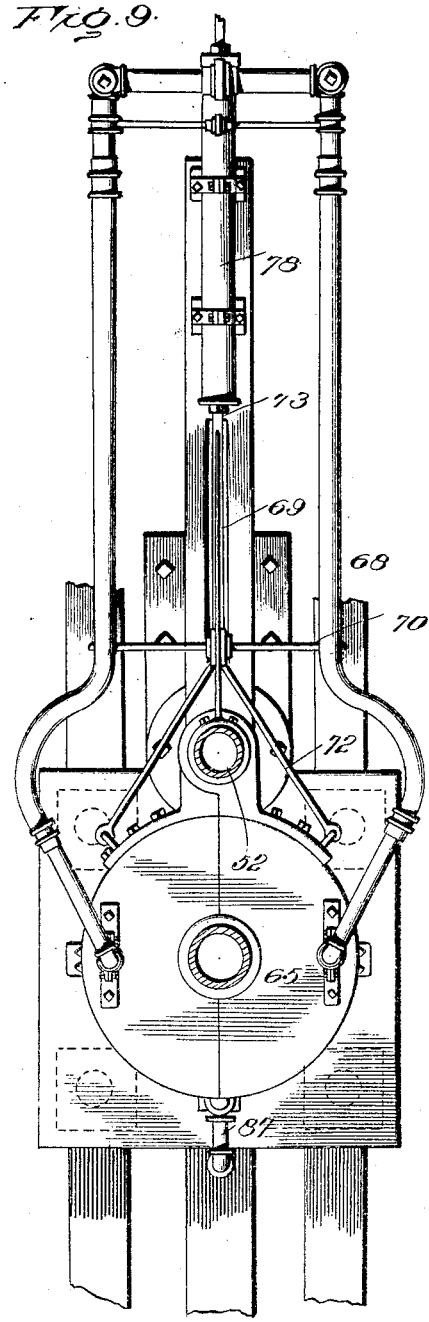
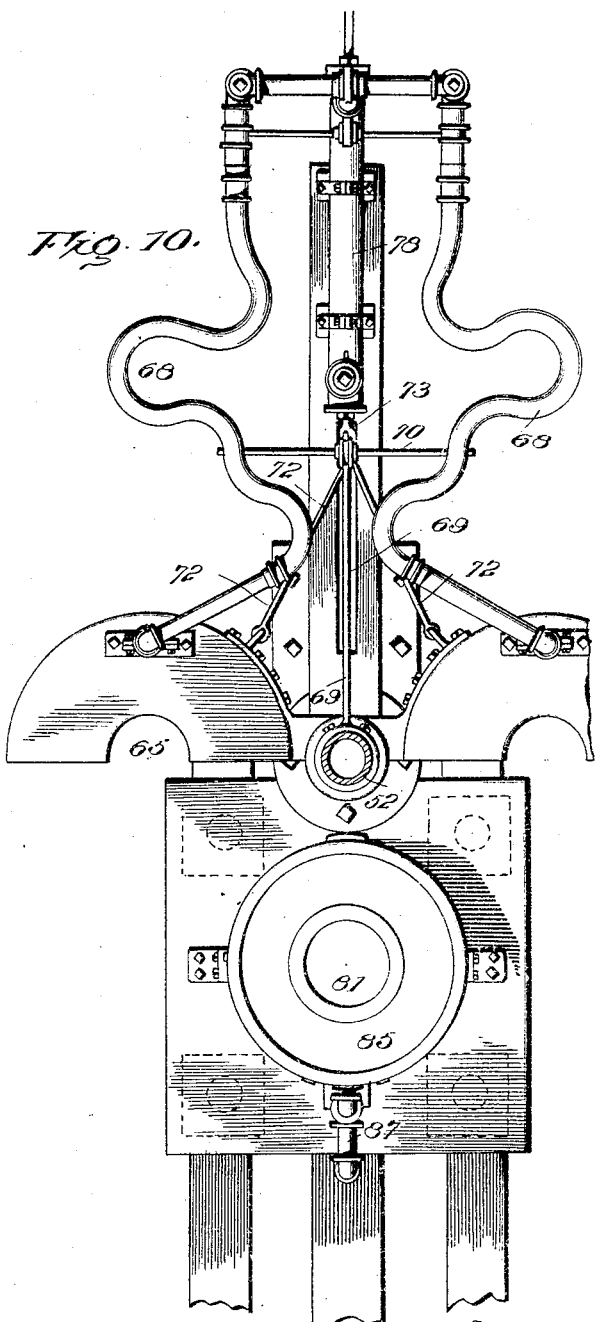
Inventor
A. Bournique
By R. & A. B. Lacey, Attorneys.
Witnesses

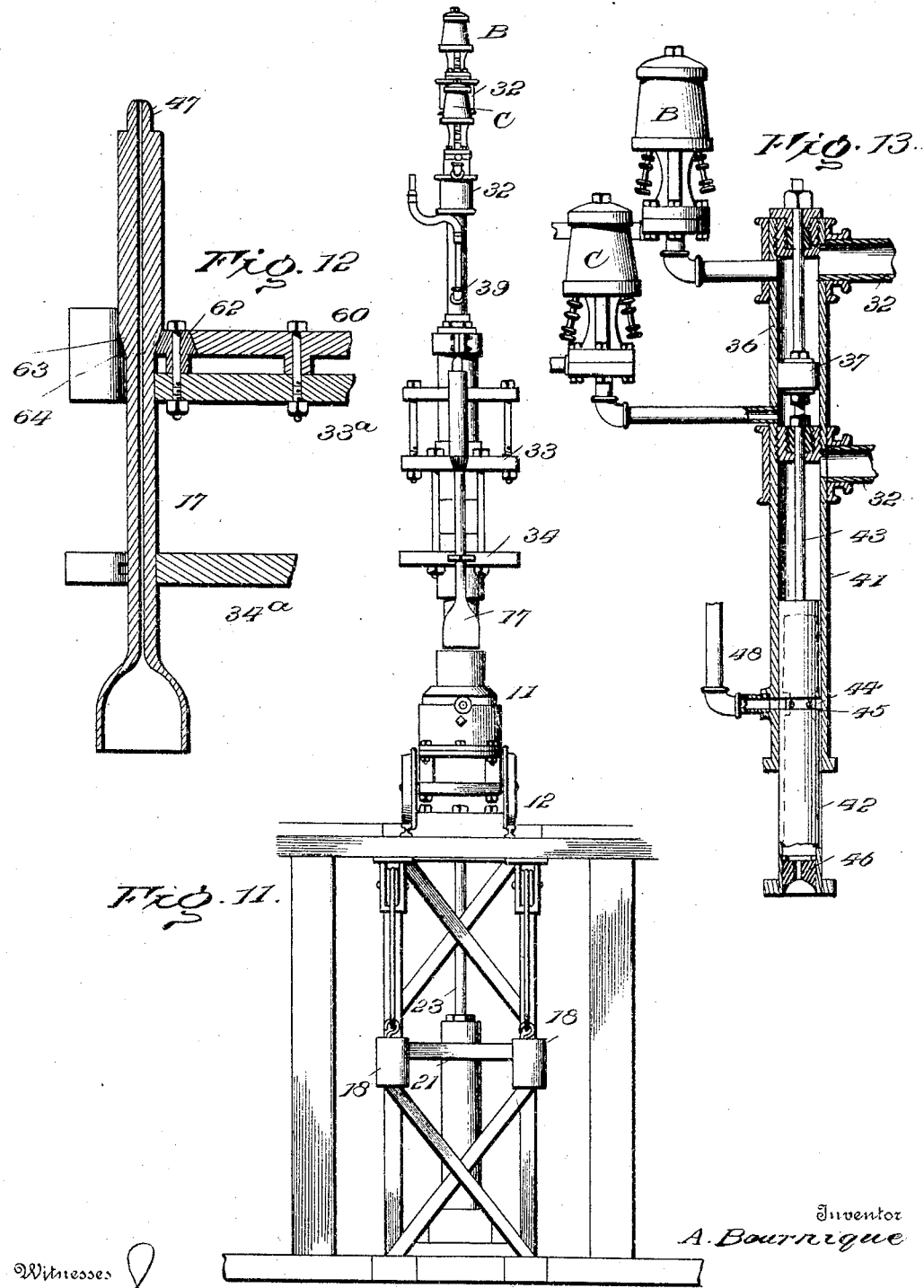

No. 771,763. PATENTED OCT. 4, 1904.
A. BOURNIQUE.
MACHINE FOR MANUFACTURING WINDOW GLASS.
APPLICATION FILED NOV. 16, 1903.
NO MODEL. 12 SHEETS—SHEET 11.
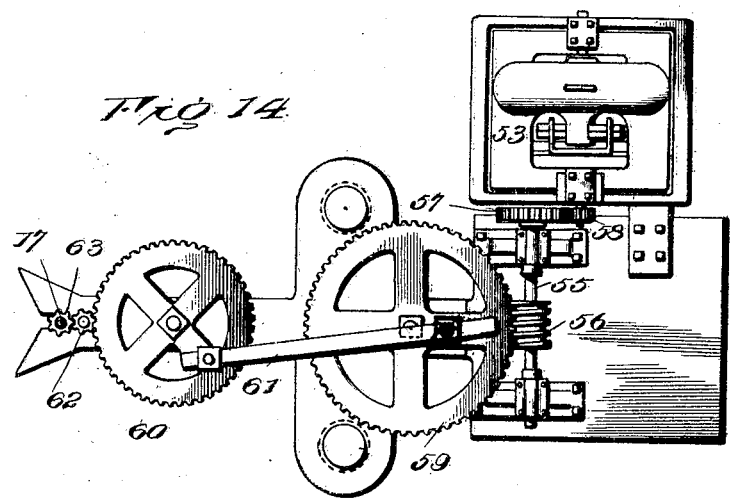
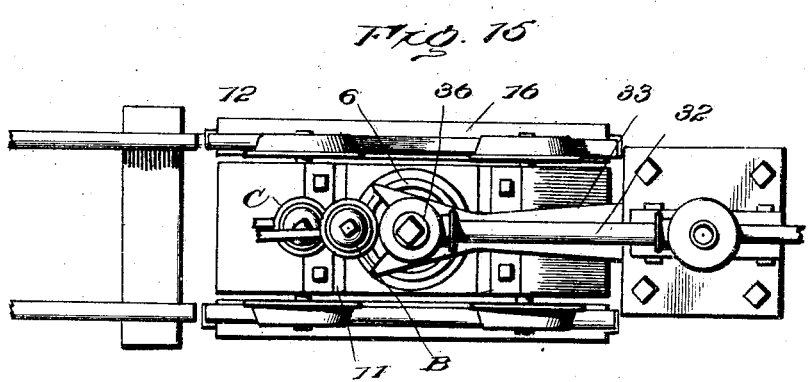
 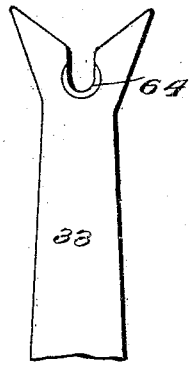 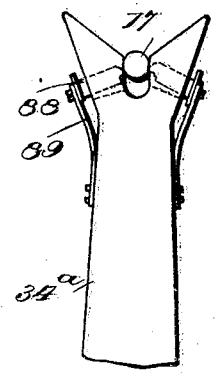 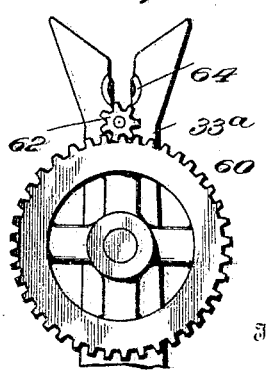
Inventor
A. Bournique No. 771,763. PATENTED OCT. 4, 1904.
A. BOURNIQUE.
MACHINE FOR MANUFACTURING WINDOW GLASS.
APPLICATION FILED NOV. 16, 1903.
NO MODEL. 12 SHEETS—SHEET 12.
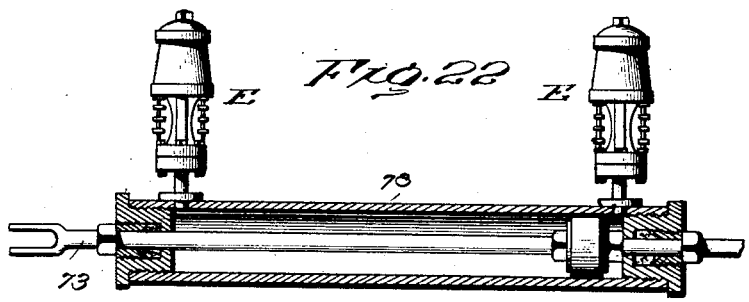
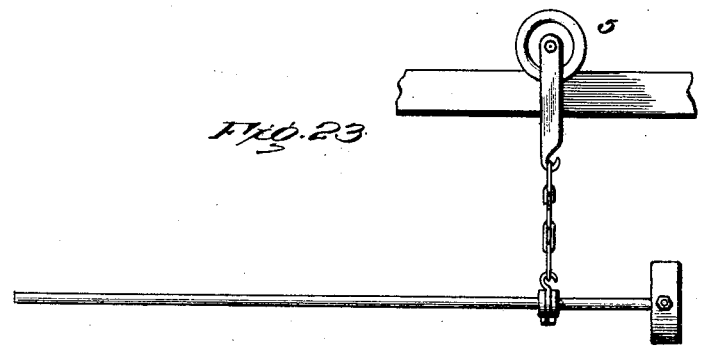
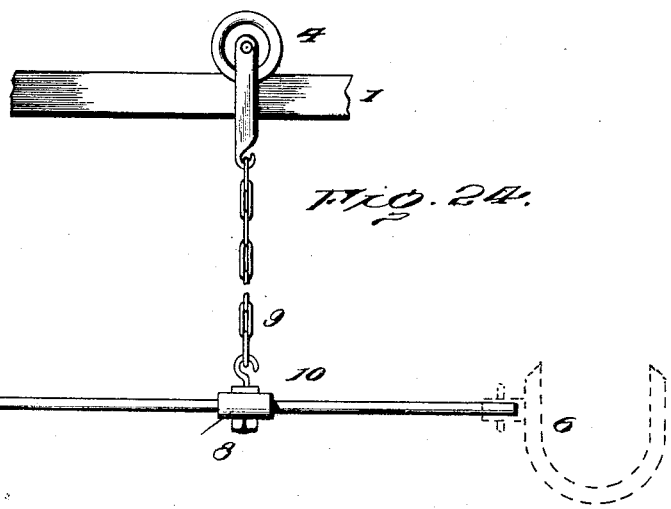
Witnesses
Inventor
A. Bournique
By Rh. A. P. Lacey, Attorneys No. 771,763. Patented October 4, 1904.

UNITED STATES PATENT OFFICE.

ADOLPHE BOURNIQUE, OF CHESTERTON, INDIANA, ASSIGNOR OF ONE-HALF TO CHARLES J. BOCKIUS, OF SYRACUSE, INDIANA, AND WILLIAM J. BORREY, OF FAIRMOUNT, INDIANA.

MACHINE FOR MANUFACTURING WINDOW-GLASS.

SPECIFICATION forming part of Letters Patent No. 771,763, dated October 4, 1904.

Application filed November 16, 1903. Serial No. 181,430. (No model.)

*To all whom it may concern:*

Be it known that I, ADOLPHE BOURNIQUE, a citizen of France, residing at Chesterton, in the county of Porter and State of Indiana, have invented certain new and useful Improvements in Machines for Manufacturing Window-Glass, of which the following is a specification.

In the glass industry, and more particularly in the manufacture of window and plate glass, large cylinders, and hollow bodies, considerable expense is entailed in the production of the class of merchandise aforesaid by reason of their weight and bulk and the means generally employed for handling and manipulating the glass during the process of manufacture.

This invention has for its object to materially reduce the cost of production, to lessen the manipulation by hand, to minimize the chances of breakage, to facilitate the operation whereby frequent reheating of the glass is obviated, and to devise a machine for accomplishing all the steps heretofore generally practiced by hand.

The machine comprises a ladle suspended from an overhead track and adapted to receive a quantity of molten glass from a tank, furnace, or other contrivance constituting the supply from which the glass is taken as used in the manufacture of the merchandise. A carrier mounted upon a truck is adapted to receive the ladle, and after the glass has been taken up from the ladle the support for the truck drops, so as to remove the truck out of the way. The blowpipe, with the glass attached thereto, is connected to an inflating-tube, by means of which the glass is blown. Means are provided for imparting a backward and forward rotary movement to the blowpipe during the several operations in order to prevent twisting of the neck of the glass during the expansion thereof. A reheater forms an essential part of the mechanism for softening the bulb when the same becomes necessary. A former is provided to limit the expansion of the bulb and insure the formation of articles of predetermined size. Actuating devices for controlling the movements of the working parts, including valves and operating means therefor, are necessary adjuncts of the mechanism and are referred to in detail in the subjoined description.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 2:
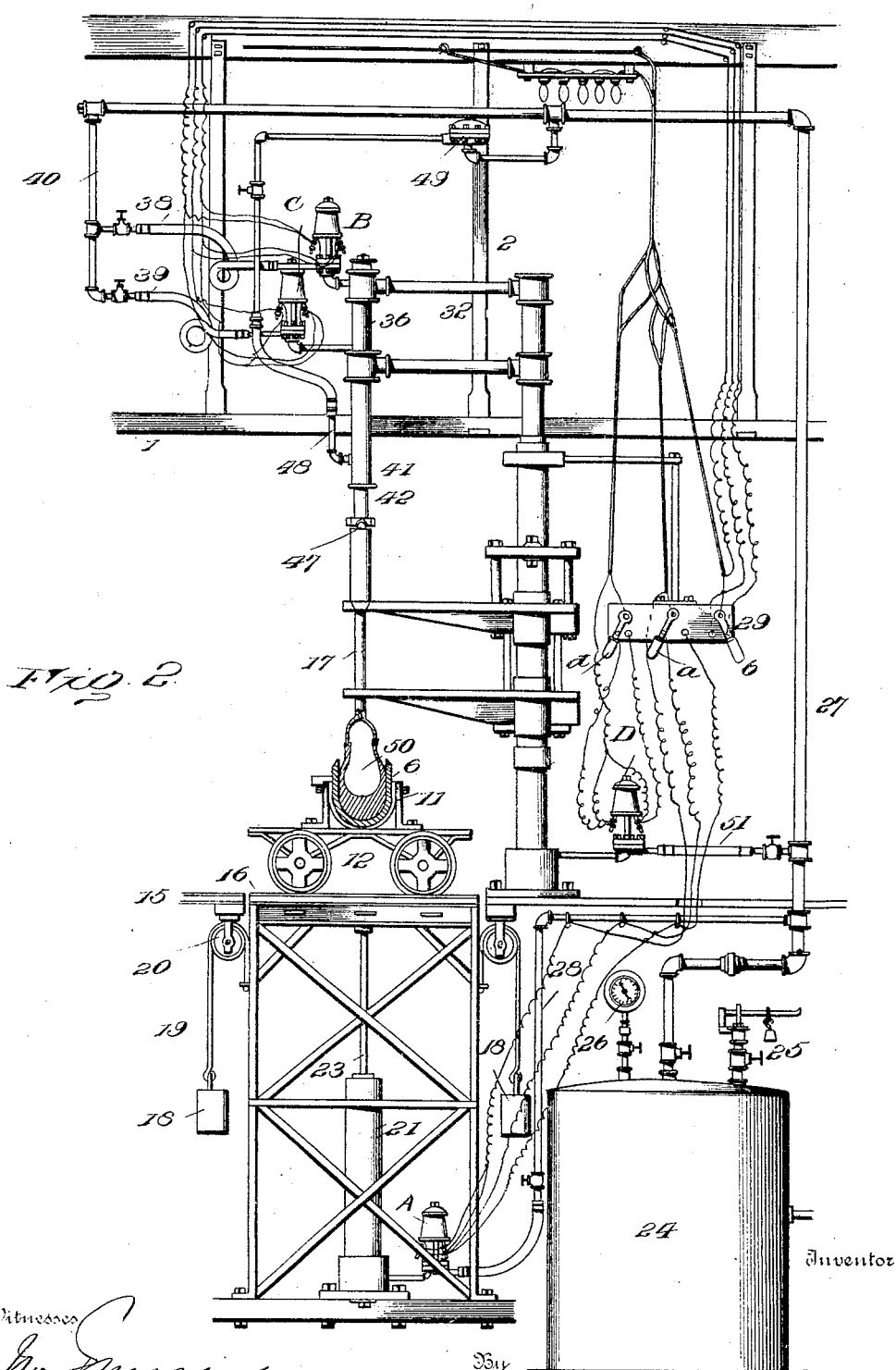
Figure 3:
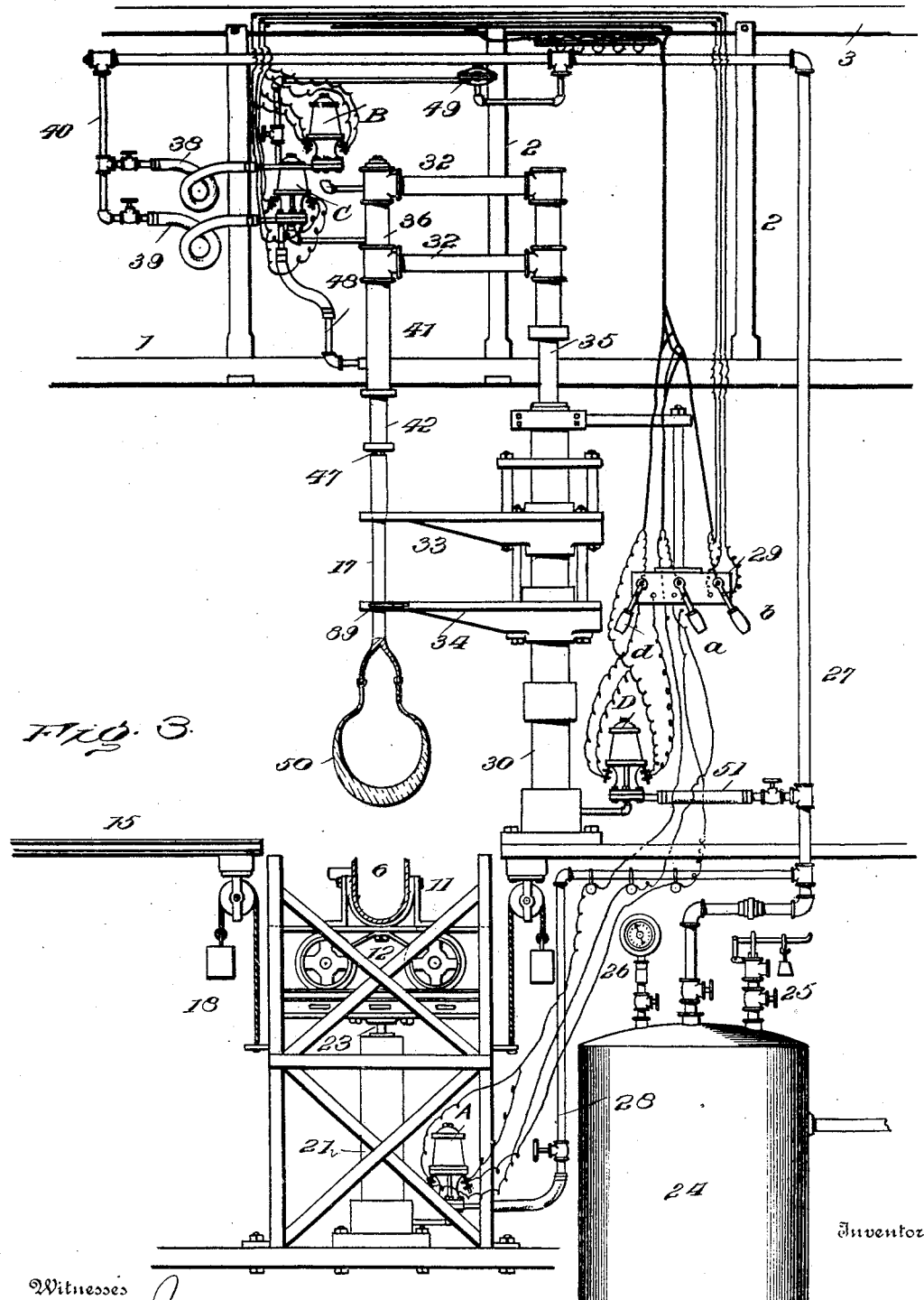
Figure 4:
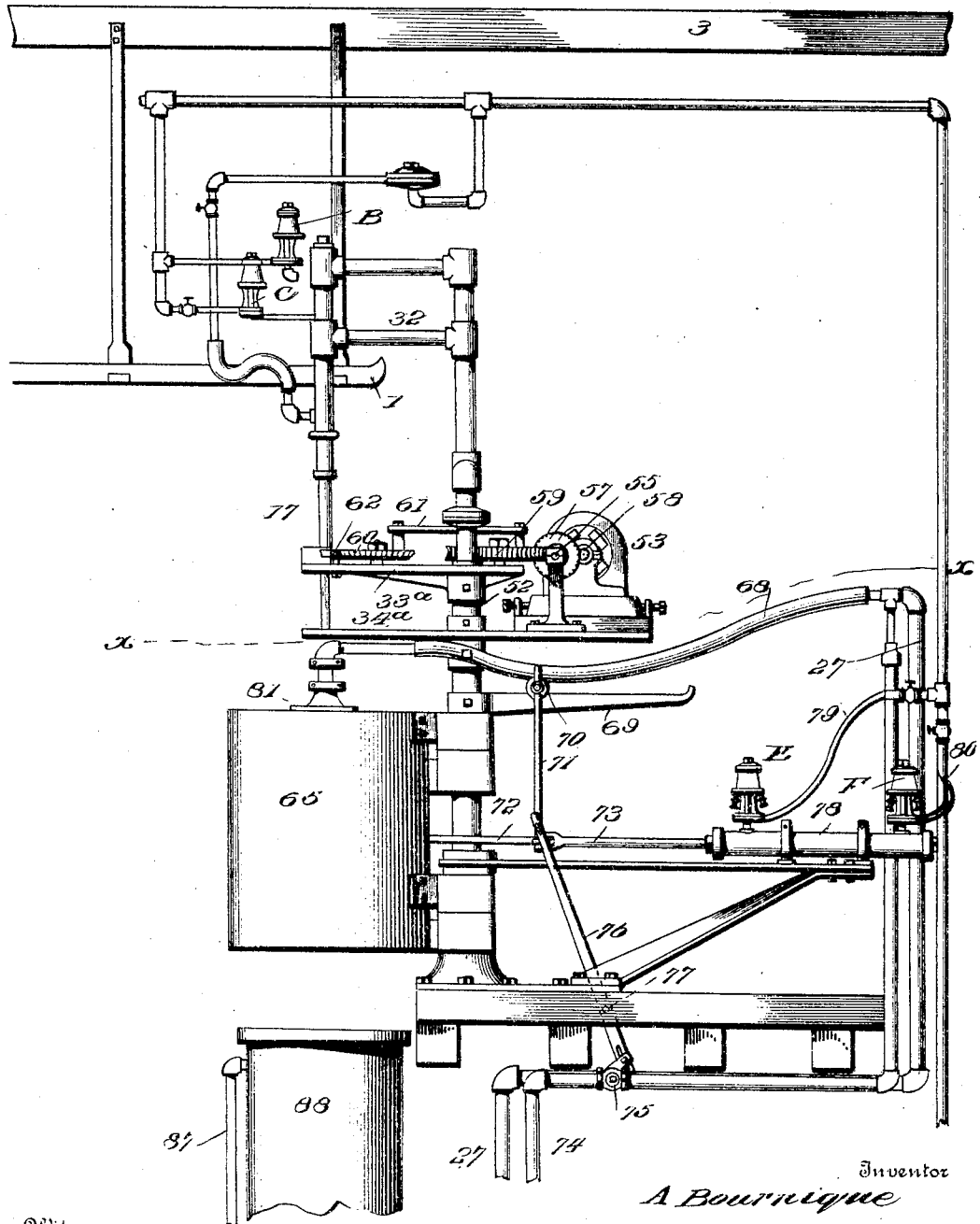

Figure 1 is a diagrammatic view of a mechanism embodying the invention. Fig. 2 is a detail view of the pressure-tank, truck, movable platform for the truck, the blowpipe, inflating-tube, valves, and supporting means for the several parts, the same being shown on a larger scale, the blowpipe being connected to the inflating-tube and having the batch of glass attached thereto and partly expanded. Fig. 3 is a view of the parts shown in Fig. 2, the truck being lowered and the glass expanded to a larger degree. Fig. 4 is a detail view in elevation of the reheater and the means for imparting a backward and forward rotation to the blowpipe together with the parts intimately associated therewith, the heater being closed. Fig. 5 is a front view of the parts shown in Fig. 4 in the same position. Fig. 6 is a view similar to Fig. 5, the reheater being open. Fig. 7 is a side view of the cooler, former, reheater, and coöperating parts and mountings, the reheater being open and the former elevated and enveloping the glass so as to give the desired shape thereto. Fig. 8 is a view of the parts shown in Fig. 7, the lower portion of the cooler being broken away and the former being lowered therein so as to expose the glass as it appears the instant it is freed from the former and disconnected from the inflating-tube. Fig. 9 is a horizontal section on the line X X of Fig. 4, the reheater being closed. Fig. 10 is a view similar to Fig. 9, showing the reheater open. Fig. 11 is a front view of the parts shown in Fig. 2. Fig. 12 is a detail view of the blowpipe and the supporting-arms therefor, the latter having their inner ends broken away and the parts being in section. Fig. 13 is a detail view of the inflating-tube and the means for effecting vertical movement thereof. Fig. 14 is a top plan view of the mechanism for imparting a backward and a forward rotary movement to the blowpipe. Fig. 15 is a top plan view of the truck, the platform therefor, the blowpipe, and the supporting means for same. Fig. 16 is a detail view of the arm for supporting the blowpipe provided with the spring-actuated grippers. Fig. 17 is a view similar to Fig. 16 of the blowpipe-supporting arm provided with the operating-gearing, the latter being omitted. Fig. 18 is a view of the parts shown in Fig. 16, illustrating the position of the grippers when the blowpipe is in position between them. Fig. 19 is a view of the arms shown in Fig. 17, having the power-transmitting gearing in position. Fig. 20 is a detail view of the vertical support and motor-cylinder coöperating with the first set of supporting-arms for the blowpipe and inflating-tube, parts being in section. Fig. 21 is a detail view in section of the motor-cylinder for operating the former. Fig. 22 is a detail view in section of the motor-cylinder for operating the sections of the reheater. Fig. 23 is a detail view in elevation of the trolley and the gripper. Fig. 24 is a detail view in elevation of the handle for the ladle; the latter being shown in dotted lines, said view also showing the trolley and suspending means for the handle. Fig. 25 is a top plan view of the gripper for transferring the blowpipe from the mechanism initially acting upon the glass to the finishing mechanism.

Corresponding and like parts are referred to in the following description and indicated in all the views of the drawings by the same reference characters.

The overhead track is indicated at 1 and is supported by hangers 2 from the ceiling, beam, or rafter 3. Trolleys 4 and 5 are mounted to travel upon the track 1 and are adapted to hold, respectively, the ladle 6 and gripper 7 in suspension, the latter being employed when transferring the blowpipe from the initial expander to the mechanism for completing the expansion of the glass and simultaneously imparting a backward and forward rotation thereto. The trolley 4 is provided with a sleeve 8, suspended therefrom by means of the chain or analogous connection 9 and adapted to receive the handle 10 of the ladle 6, said handle being detachably connected with a lug at one side of the ladle. The ladle 6 may be of any size and construction, and is preferably of forged steel, and is adapted to snugly fit the carrier 11 of the truck 12.

The tank 13 is adapted to receive the molten glass and may be a furnace or reservoir such as commonly employed for receiving the refined glass to be worked and fashioned into the required merchandise. The ladle is introduced through an opening 14 in a side of the tank or furnace when it is required to obtain a quantity of glass, the weight of the ladle and material being suspended by the trolley 4 and track 1. The truck 12 is moved upon the track 15 into convenient position to receive the ladle 6 when withdrawn from the furnace or tank. After the ladle has been snugly fitted in the carrier 11 the handle 10 is disconnected therefrom and the truck moved upon the track 15 away from the tank, so as to occupy a position on the platform 16 in vertical alinement with the blowpipe 17. The platform 16 is counterbalanced by weights 18, flexiby connected thereto by cables or chains 19, passed over guide-pulleys 20. The motor-cylinder 21 is connected with the platform 16 to effect vertical movement thereof for raising and lowering the truck 12. The piston 22, arranged to operate in the cylinder 21, is connected with the platform 16 to effect vertical movement thereof for raising and lowering the truck 12. The piston 22, arranged to operate in the cylinder 21, has its rod 23 connected to the platform 16 in any substantial manner to cause the parts to move in unison. Any desired medium may be employed for actuating the piston 22, compressed air being preferred, and stored in a reservoir or tank 24. This pressure-tank 24 is provided with any type of safety-valve 25 to relieve dangerous pressure and with a gage 26 to indicate the number of pounds of air contained in the tank. The distributing-pipe 27 is connected with the pressure-tank 24, and branches are coupled thereto for conveyance of the compressed air or actuating medium to various operating parts. The branch pipe 28 connects the distributing-pipe 27 with the lower end of the motor-cylinder 21 and is provided with a valve A for controlling the admission of the compressed air into the motor-cylinder and the escape of the air therefrom when no longer required for operation. The valve A may be of any type so long as it enables the attainment of the desired end. It is preferred to have the valve of the variety to be controlled by an electric current, the same being operated by means of a switch-lever $a$, conveniently located upon the switchboard 29. In one position of the switch-lever $a$ compressed air is admitted into the motor-cylinder so as to elevate the platform and support the truck in line with the track 15. In another position of the switch-lever *a* the supply of compressed air is shut off from the motor-cylinder and communication is effected between said motor-cylinder and the atmosphere to permit escape of the air confined in the cylinder below the piston 22, thereby permitting the platform and truck to descend, as indicated most clearly in Fig. 3.

A motor-cylinder 30 has its piston 31 connected to arms 32, 33, and 34 by means of the rod 35, whereby the parts move together when traveling upward or downward. There are two arms 32, and they carry a motor-cylinder 36, in which operates piston 37. The arms 33 and 34 are constructed at their outer ends to receive and support the blowpipe 17 in the operation of the machine. Any suitable means may be applied to the arms 33 and 34 for retention of the blowpipe, but yet admit of its removal by proper manipulation when required. Flexible tubes 38 and 39 connect a branch pipe 40 of the distributing-pipe 27 with valves B and C, connected, respectively, with the opposite ends of the motor-cylinder 36. These valves B and C are similar in construction to the valve A and are electrically controlled by means of the switch-lever *b*, which is mounted upon the switchboard 29. In one position of the switch-lever *b* compressed air is admitted into one end of the motor-cylinder 36 and exhausted from the opposite end, whereby the piston 37 is positively actuated in one direction. In another position of the lever *b* the compressed air is admitted into the opposite end of the motor-cylinder, so as to effect positive movement of the piston 37 in a reverse direction, the parts being so disposed that as the compressed air enters one end of the motor-cylinder the air in the opposite end is exhausted, thereby obviating cushioning of the piston. A cylinder 41 is attached to or forms a part of the motor-cylinder 36 and receives the inflating-tube 42, which fits within the cylinder 41 steam-tight. The inflating-tube 42 is connected to the rod 43 of the piston 37 and is provided intermediate of its ends with an annular groove 44, in communication with the bore or space of the tube by a series of openings 45. The lower end of the inflating-tube is closed by a packing 46, which is adapted to make a close fit with the rounded end 47 of the blowpipe 17 when the two are connected. The pipe 48 connects with the cylinder 41 at a point near the lower end thereof, so that when the inflating-tube is at its lowest position the annular groove 44 is in register with the pipe 48, thereby permitting air to pass therefrom into the tube and thence into the blowpipe. The pipe 48 connects with a pressure-reducer 49, which is connected with a distributing-pipe 27 and which reduces the pressure of about eighty pounds to about two ounces, thereby admitting of gentle and slow expansion of the glass 50.

The motor-cylinder 30 has its lower end connected by branch pipe 51 with the distributing-pipe 27, and the compressed air is regulated by the valve D in the length of the pipe 51 and adapted to be controlled by the switch-lever *d*, mounted upon the switchboard 29. When the switch-lever *d* is moved to one position, the piston 31 and rod 35 are moved upward, carrying the motor-cylinder 36 and blowpipe 17 therewith. When the valve D is moved to the opposite position, the air is permitted to exhaust from the cylinder 30 below the piston 31, thereby permitting the latter and the parts controlled thereby to gravitate and the blowpipe to descend into the ladle, so as to receive the glass therefrom. After the blowpipe has entered the ladle and the glass becomes attached thereto the switch-lever *d* is moved so as to operate valve D and admit air into the cylinder 30 below the piston 31, whereby said piston and blowpipe are elevated to the position about as shown in Fig. 2. This operation elongates the glass and forms the neck. The lever *a* is now operated to actuate the valve A, so as exhaust the air from the motor-cylinder 21, thereby permitting the platform and truck to descend out of the way. The switch-lever *b* is now moved to operate valves B and C to admit compressed air above the piston 37 and to exhaust the same from beneath the piston, thereby permitting downward movement of the piston and inflating-tube. When the inflating-tube 42 is at its lowest position, it makes close connection with the blowpipe, and at the same time communication is established between the inflating-tube and the supply branch 48, when the air passing into the inflating-tube is directed into the blowpipe and the glass 50, gradually expanding the latter, as indicated most clearly in Fig. 3. After the glass 50 has been expanded to form a bulb of required size the lever *b* is again operated to actuate valves B and C to effect upward movement of the piston, thereby disconnecting the inflating-tube 42 from the blowpipe and at the same time shutting off the supply of air to the inflating-tube, the latter acting in the capacity of a cut-off. At this stage of the operation the gripper 7 is brought into play and takes hold of the blowpipe 17, and upon the application of sufficient force the blowpipe is disconnected from the supporting-arms 33 and 34 and is transferred to the finishing mechanism, by means of which the blowpipe is rotated backward and forward, the glass bulb being reheated, elongated, shaped, and cooled.

The expanding mechanism employed in the second step of the operation is a duplicate of that employed in the first step. Hence a detailed description thereof is not deemed necessary, corresponding parts being designated by the same reference characters.

Arms 33ª and 34ª, corresponding to the arms 33 and 34, are attached to an upright 52 and receive and support the blowpipe 17 in the finishing operation. The arm 34ª is extended in an opposite direction and supports a motor 53, by means of which the blowpipe is operated. The motor 53 is preferably of the electric variety and is connected by conductors to a rheostat circuit-closing lever 54, which admits of controlling the movement of the motor, as may be required. The means for closing the motor-circuit are conveniently located to the switchboard 29 and, as shown, comprise a circuit-closing switch and the rheostat-lever. The power-transmitting means comprise the shaft 55, having worm-thread 56 and gear-wheel 57, a pinion 58, secured to the motor-lever and in mesh with the gear-wheel 57, worm-gear 59, in mesh with the worm-thread 56, gear-wheel 60, connected by pitman 61 to worm-gear 59, idle pinion 62, in mesh with the teeth of the gear-wheel 60, and the pinion 63, forming a part of or applied to the blowpipe. The gear-wheel 60 and pinion 62 are journaled to pins applied to the arm 33ª, and the cogs are inclined. As shown most clearly in Fig. 12, the upper portion of the blowpipe is of larger diameter, and the pinion 63 is located at the juncture of the large and small portions and is preferably an integral part of the blowpipe, being upwardly flared, thereby serving as a stop-shoulder to support the blowpipe when the machine is in operation. The upper side of the arm 33ª is provided with a conical seat 64 to receive the toothed portion 63 of the blowpipe and support the same against vertical displacement. After the blowpipe 17 has been placed in position it drops slightly to enable the part 63 to enter the seat 64 and to mesh with the teeth of the pinion 62. The pitman 61 is connected to the gear-wheels 59 and 60 at different distances from their centers, so as to insure an oscillatory movement of the gear-wheel 60 essential to impart a backward-and-forward movement to the blowpipe in the final steps of finishing the article.

The reheater is indicated at 65 and comprises similar halves or sections hinged together in line with the upright 52, which preferably passes through hinged lugs projected from the sections or parts of the heater. By having the reheater composed of sections mounted in the manner stated they are adapted to readily close around the glass bulb and to open out of the way thereof when said bulb is sufficiently softened. The reheater may be of any structural type so long as it subserves the purpose of softening the glass. It is preferred to have each of the sections made hollow and to have the inner wall studded with openings, as indicated at 66, through which the flame has access to the glass. The lower end of the heater is open to admit of observing the lower end of the bulb when elongated to the requisite degree. An observation-slot 67 is formed in a side of the heater and admits of inspecting the glass bulb at all times during the process of reheating and expansion. A flexible tube 68 connects the upper end of each section of the reheater with the distributing-pipe 27. An arm 69 projects from the upright 52 and supports a carriage 70, which is provided at opposite ends with rests for receiving the flexible tube 68. A rod or bar 71 is pendent from the carriage 70 and constitutes a hanger and is connected with links 72 and piston-rod 73 at their point of juncture. The links 72 are loosely connected to the sections of the reheater in such a manner as to effect an opening and a closing thereof according as the piston-rod 73 is thrust outward or moved inward. The pipe 74 connects with a suitable source of gas-supply and is in communication with the flexible tube 68 and is driven forward into the space of the reheater-sections and through the openings 66 by the blast of air derived from the pipe 27. A valve 75 is provided for controlling the supply of air and gas to the reheater and is connected with the operating means employed for opening and closing the sections of the reheater, so as to be simultaneously operated therewith. When the sections of the reheater are closed, the valve 75 is opened to its fullest extent, thereby admitting of the predetermined supply of air and gas being admitted to the reheater; but when the sections of said reheater are open the valve 75 is closed, or nearly so, thereby permitting a minimum amount of gas being supplied to the reheater for maintaining the same heated and preventing cooling thereof. As shown, a lever 76, fulcrumed at 77, has its lower end connected to an arm of the valve 75 and its opposite end connected to the hanger 71 or connecting means between said hanger and the piston-rod 73.

A motor-cylinder 78, similar in construction to the motor-cylinders herein described, is horizontally arranged, and the piston-rod 73 and its piston are connected to the links 72 and lever 76 in any way. Valves E and F are connected to opposite ends of the motor-cylinder and to the distributing-pipe 27 by means of flexible tubes 79 and 80. The valves E and F operate in substantially the same manner as the valves B and C and are adapted to be controlled by the switch-lever $e$, which in one position operates the valves to admit air into one end of the cylinder and to exhaust it from the opposite end and in another position reverses said valves so as to drive the piston of the motor-cylinder 78 in an opposite direction. When the piston-rod 73 is moved outward, the sections of the reheater 65 are closed, and when the piston-rod is moved into the cylinder 78 said reheater-sections are opened.

The former for giving the required shape to the finished article is of metal lined with paste and is constructed of sections outwardly flanged and secured together by fastenings passed through openings of the flanges. The former is indicated at 81 and is open at its upper end and closed at its lower end and is connected to the rod 82, coupled to or forming an extension of the rod provided with the piston 83, arranged within the motor-cylinder 84. After the glass bulb has been expanded and elongated the former 81 is moved upward so as to envelop the bulb and give the predetermined shape thereto, as indicated most clearly in Fig. 7. The piston 83 is moved in the cylinder 84 by means of compressed air derived from the distributing-pipe 27 and controlled by valves G and H, constructed and operating in a manner similar to the valves B and C and E and F. The switch-lever $g$ controls the valves G and H to admit the air at one end of the cylinder and provide an escape for the confined air at the opposite end.

The cooler 85 consists of a tank and is located so as to receive the former 81 when at its lowest position. The cooler is maintained at the proper temperature by water supplied thereto by means of the pipe 86, the warm water passing off by way of the pipe 87 and discharging at any convenient point. The cool water enters the lower portion of the tank 85, whereas the warm water passes off from the upper end.

The arms 33 and $33^a$ are constructed substantially alike, each having its outer end forked and the outer ends of the fork members flared to direct the blowpipe into the crotch. The seat 64 is formed in the upper side of the arm at the inner end of the crotch. The arms 34 and $34^a$ have their outer ends constructed similar to the outer ends of the arms 33 and $33^a$ and have the jaws formed with lateral openings in which the dogs or grippers 88 are located, the inner ends of said dogs being adapted to close in front of the blowpipe and retain the same in place, as indicated most clearly in Fig. 16. Flat springs 89 carry the grippers 88 and are attached to opposite sides of the arms by suitable fastenings. The gripping ends of the elements 88 are constructed to admit of the grippers being forced apart upon the application of sufficient force to the blowpipe when placing the same in position or removing it from the arms.

In practicing the invention the ladle 6, suspended from the trolley 4 and track 1, is manipulated by hand and introduced into the opening 14 of the tank 13 and receives a quantity of molten glass, after which the ladle is withdrawn and deposited upon the truck 12, which is run out upon the track 15 onto the platform 16. The switch-lever $d$ is now operated to permit the blowpipe 17, carried by the arms 33 and 34, to descend into the ladle, so as to take up the glass. The said lever $d$ is again operated to admit air into the lower end of the motor-cylinder 30, whereby the blowpipe, with the glass, is carried upward and the lever $a$ is operated to permit the platform and truck to descend out of the way, after which the lever $b$ is moved to cause the inflating-tube 42 to descend and make connection with the blowpipe and to establish communication between the inflating-tube and the air-pipe 48. The glass attached to the blowpipe is gradually expanded to form the bulb 50, and after the same has attained the desired size the lever $b$ is again operated to cause upward movement of the inflating-tube to disconnect it from the blowpipe and to shut off the blast by means of which the bulb is formed. The gripper 7 is brought into operation at this stage and takes hold of the blowpipe and transfers the same from the arms 33 and 34 to the arms $33^a$ and $34^a$, whereby said blowpipe is connected with the oscillating mechanism. Upon moving the lever 54 the motor 53 is set in operation and through the connections herein described causes the blowpipe to rotate backward and forward. The lever $e$ is moved to effect a closing of the sections of the reheater 65 about the bulb 50, so as to soften the same, and the lever $b$ is operated to cause the inflating-tube 42 to make connection with the upper end of the blowpipe, whereby the bulb is expanded simultaneously with its softening. When the bulb is elongated to the required extent, the lever $e$ is again operated to cause opening outward of the reheater-sections, and at the same time the lever $g$ is moved to effect upward movement of the former 81, so as to envelop the bulb and give the desired shape thereto. After the bulb has been shaped the lever $g$ is again moved to cause the former to descend into the cooler 85, and the lever $b$ is moved to cause upward movement of the inflating-tube and disconnection thereof from the blowpipe. The cylinder thus formed is transferred to a stand, and the ends are cracked off and the cylinder split longitudinally and transferred to a table, upon which it opens flat to form window or plate glass.

Having thus described the invention, what is claimed as new is—

1. In apparatus for the manufacture of glass articles, the combination of a ladle for containing the molten glass, suspending means for sustaining the ladle when manipulated, a truck for receiving the ladle, a blowpipe, means for lowering the blowpipe into the ladle and means for lowering the truck, substantially as and for the purpose specified.

2. In apparatus for the manufacture of glass articles, the combination of a ladle for containing the molten glass, suspending means for sustaining the ladle when manipulated, a truck for receiving the ladle, a blowpipe, supporting means for the blowpipe, and actuating means for lowering the blowpipe into the ladle and lifting the same therefrom, substantially as described.

3. In apparatus for the manufacture of glass articles, the combination of a ladle for containing the molten glass, suspending means for sustaining the ladle when manipulated, a truck for receiving the ladle, a blowpipe, supporting means for the blowpipe, actuating means for lowering the blowpipe into the ladle and lifting the same therefrom, and means for lowering the truck after the blowpipe has taken up the glass, substantially as specified.

4. In apparatus for the manufacture of glass articles, the combination of a ladle for receiving a quantity of molten glass, a handle having detachable connection with the ladle, suspending means connected with the said handle, a carrier for receiving the ladle when in working position, and a counterbalanced support for sustaining the carrier and adapted to move vertically to effect a lowering and a raising of the ladle, substantially as specified.

5. In apparatus for the manufacture of glass articles, the combination of a ladle for receiving a quantity of molten glass, a handle having detachable connection with the ladle, suspending means connected with said ladle, a truck mounted to run upon a track and adapted to receive the ladle, a vertically-movable platform for sustaining the truck, and means for effecting a lowering and a raising of said platform, substantially as set forth.

6. In apparatus for the manufacture of glass and analogous articles, the combination of a blowpipe, supporting means therefor, an inflating-tube, a support therefor, means for moving the blowpipe and inflating-tube supports together in each direction, and means for moving the inflating-tube relative to its support to make connection with or to be disconnected from the blowpipe, substantially as set forth.

7. In apparatus for the manufacture of glass and analogous articles, the combination of a blowpipe, an inflating-tube adapted to move toward and from the blowpipe having an annular groove in its outer side in communication with the said tube, a cylinder forming a guide for the inflating-tube, and an air-pipe connected to the cylinder and adapted to register with the annular groove of the inflating-tube when the latter is moved to make connection with the blowpipe, the inflating-tube shutting off the supply of air when disconnected from the blowpipe, substantially as described.

8. In apparatus for the manufacture of glass and analogous articles, the combination of a blowpipe, a motor-cylinder, a guide-cylinder in line with the motor-cylinder, an inflating-tube arranged to operate the guide-cylinder, the piston mounted to travel in the motor-cylinder having connection with the inflating-tube, means for admitting motive medium in one end of the motor-cylinder and exhausting the medium confined in the opposite end portion, and an air-pipe for supplying the inflating-tube, substantially as set forth.

9. In apparatus for the manufacture of glass and analogous articles, the combination of an upright, supporting-arms slidably mounted upon the upright and arranged one above the other, a blowpipe adapted to be detachably fitted to the lower arms, an inflating-tube, supporting means for the inflating-tube connected with the upper supporting-arms, and means for moving the inflating-tube independent of its support toward and from the blowpipe, substantially as set forth.

10. In apparatus for the manufacture of glass and analogous articles, the combination of a blowpipe, means for connecting said blowpipe with a source of air-supply, and means for imparting an oscillatory movement to the blowpipe, substantially as set forth.

11. In apparatus for the manufacture of glass and analogous articles, the combination of a blowpipe provided with cog-gearing, a support with which the blowpipe makes detachable connection, a train of gearing connected with said support and adapted to make connection with the blowpipe when the latter is placed in position to impart an oscillatory movement thereto, and means for supplying air to the blowpipe, substantially as specified.

12. In apparatus for the manufacture of glass and analogous articles, the combination of a cylinder, an inflating-tube movable in said cylinder and having an annular groove in a side in communication with the space-tube, an air-supplying pipe connected with the cylinder for charging the inflating-tube, a blowpipe adapted to make connection with the inflating-tube, and means for imparting an oscillatory movement to the blowpipe, substantially as described.

13. In apparatus for the manufacture of glass and analogous articles, the combination of an upright, supporting-arms fitted thereto, a motor suspended by one of the supporting-arms, a train of gearing applied to the other supporting-arm and connected with the motor, and a blowpipe adapted to make detachable connection with the supporting-arms and having cog-gearing to intermesh with the train of gearing and receive motion therefrom when the blowpipe is in position, substantially as set forth.

14. In apparatus for the manufacture of glass and analogous articles, the combination of a blowpipe, means for supplying glass thereto, a reheater for softening the glass, and means for operating the reheater so as to receive the glass preliminary to softening and to clear the same when softened, substantially as set forth.

15. In apparatus for the manufacture of glass and analogous articles, the combination of a blowpipe, means for supplying glass thereto, a reheater for softening the glass, composed of sections, and means for opening and closing said sections, substantially as described.

16. In apparatus for the manufacture of glass and analogous articles, the combination of a blowpipe, means for supplying glass thereto, a reheater for softening the glass composed of hinged sections, and means for turning said sections upon their axes so as to close around the glass or open outward therefrom, substantially as specified.

17. In apparatus for the manufacture of glass and analogous articles, the combination of a blowpipe, means for supplying glass thereto, a reheater for softening the glass, means for supplying gas to the reheater, a valve for controlling the supply of gas, and actuating means for simultaneously operating the reheater and the gas-regulating valve, substantially as set forth.

18. In apparatus for the manufacture of glass and analogous articles, the combination of a blowpipe, means for supplying glass thereto, a reheater for softening the glass, means for supplying gas to the reheater, an air-pipe for creating a blast, a valve for controlling the supply of air and gas, and actuating means for simultaneously operating the reheater and the air and gas controlling valve, substantially as specified.

19. In apparatus for the manufacture of glass and analogous articles, the combination of a blowpipe, means for supplying glass thereto, a reheater for softening the glass composed of similar hollow sections, the inner wall of which is provided with openings, air and gas pipes, a flexible tube connecting said air and gas pipes with each section of the reheater, means for moving the sections to effect an opening and a closing of the reheater, and a movable support for the flexible tube for sustaining the same during the movements of the reheater-sections, substantially as described.

20. In apparatus for the manufacture of glass and analogous articles, the combination of a blowpipe, means for supplying glass thereto, a reheater for softening the glass composed of hinged sections, a rectilinearly-movable driver, links connecting said driver with the hinged sections of the reheater, and a support for the contiguous ends of the links and driver, substantially as set forth.

21. In apparatus for the manufacture of glass and analogous articles, the combination of a blowpipe, means for supplying glass thereto, a reheater for softening the glass composed of hinged sections comprising hollow walls, the inner wall being provided with openings, an air and a gas pipe, a flexible tube connecting said air and gas pipes with each of the sections of the reheater, a rectilinearly-movable driver, links connecting said driver with the sections of the reheater, and a movable support for the aforesaid flexible tube and the contiguous ends of the driver and links, substantially as described.

22. In apparatus for the manufacture of glass and analogous articles, the combination of a blowpipe, means for supplying glass thereto, a reheater for softening the glass composed of hinged sections comprising hollow walls, the inner wall being provided with openings, an air and a gas pipe, a flexible tube connecting said air and gas pipes with each of the sections of the reheater, a rectilinearly-movable driver, links connecting said driver with the sections of the reheater, a movable support for the aforesaid flexible tube and the contiguous ends of the driver and links, a valve for controlling the supply of air and gas, and connecting means between said valve and the aforementioned movable support whereby the valve and sections of the heater are simultaneously operated, substantially as set forth.

23. In apparatus for the manufacture of glass and analogous articles, the combination of a blowpipe, means for supplying glass thereto, actuating mechanism for oscillating said blowpipe, means for supplying air for inflating the glass, a former for shaping the glass during the inflating operation, and means for moving the former toward and from the blowpipe, substantially as set forth.

24. In apparatus for the manufacture of glass and analogous articles, the combination of a blowpipe, means for supplying glass thereto, actuating mechanism for oscillating said blowpipe, means for supplying air for inflating the glass, a former for shaping the glass during the inflating operation, means for moving the former toward and from the blowpipe, and a cooler for chilling the former when withdrawn from the glass, substantially as set forth.

25. In apparatus for the manufacture of glass and analogous articles, the combination of a blowpipe, means for supplying glass thereto, actuating mechanism for oscillating said blowpipe, means for supplying air for inflating the glass, a former for shaping the glass during the inflating operation, a cooler arranged below the blowpipe and in line therewith, and actuating means operating through the cooler for raising and lowering the former, substantially as specified.

26. In apparatus for the manufacture of glass and analogous articles, the combination of a ladle for receiving a quantity of glass, suspending means for sustaining the ladle during its manipulation by hand, a truck for receiving the ladle, a vertically-movable support for said truck, a blowpipe, means for lowering and raising the blowpipe, an inflating-tube, means for moving the inflating-tube toward and from the blowpipe, a second inflating-tube, means for transferring the blowpipe into position for making connection with the second inflating-tube, actuating means for oscillating the blowpipe, a reheater for softening the glass, means for throwing the reheater into and out of operative position, a former, operating means therefor, and a cooler for chilling the former, substantially as specified.

In testimony whereof I affix my signature in presence of two witnesses.

ADOLPHE BOURNIQUE. [L. S.]

Witnesses:
   CHARLES L. JEFFREY,
   EDWARD L. MORGAN.